United States Patent
Shibaike et al.

(10) Patent No.: US 12,028,283 B2
(45) Date of Patent: Jul. 2, 2024

(54) BASE STATION, TERMINAL AND COMMUNICATION METHOD

(71) Applicant: Panasonic Intellectual Property Corporation of America, Torrance, CA (US)

(72) Inventors: Naoya Shibaike, Kanagawa (JP); Hidetoshi Suzuki, Kanagawa (JP); Ayako Horiuchi, Kanagawa (JP); Ankit Bhamri, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 368 days.

(21) Appl. No.: 17/421,689

(22) PCT Filed: Aug. 28, 2019

(86) PCT No.: PCT/JP2019/033771
§ 371 (c)(1),
(2) Date: Jul. 8, 2021

(87) PCT Pub. No.: WO2020/144890
PCT Pub. Date: Jul. 16, 2020

(65) Prior Publication Data
US 2022/0094497 A1    Mar. 24, 2022

(30) Foreign Application Priority Data

Jan. 10, 2019 (JP) .................................. 2019-002330

(51) Int. Cl.
*H04J 3/00* (2006.01)
*H04L 5/00* (2006.01)
(52) U.S. Cl.
CPC ............ *H04L 5/0048* (2013.01); *H04L 5/006* (2013.01); *H04L 5/0085* (2013.01)

(58) Field of Classification Search
CPC ..... H04L 5/0048; H04L 5/006; H04L 5/0085; H04L 1/0026; H04L 1/0027;
(Continued)

(56) References Cited

U.S. PATENT DOCUMENTS 5,982,831 A * 11/1999 Chu ...................... H04J 3/0688
  331/11
6,157,616 A * 12/2000 Whitehead ............ H04W 52/20
  370/465

(Continued)

FOREIGN PATENT DOCUMENTS

JP        6301302 B2    3/2018
WO    2018/070355 A1   4/2018

OTHER PUBLICATIONS

3GPP TS 38.214 V15.3.0, "3rd Generation Partnership Project; Technical Specification Group Radio Access Network; NR; Physical layer procedures for data (Release 15)," Sep. 2018, 97 pages.

(Continued)

*Primary Examiner* — Amancio Gonzalez
(74) *Attorney, Agent, or Firm* — Seed IP Law Group LLP

(57) ABSTRACT

A base station capable of appropriately transmitting a reference signal in an unlicensed band and a reception quality report measured using said reference signal. A control unit (102) of a base station (100) changes: the reference signal transmission timing which was set before carrier sensing on the basis of a time resource set according to carrier sensing results; and/or the report timing of the quality information measured in a terminal 200 using the reference signal. A transmission unit (108) and a receiving unit (109) communicate the reference signal or quality information on the basis of the changed timing.

7 Claims, 9 Drawing Sheets

(58) Field of Classification Search
CPC ............. H04L 5/0057; H04L 27/0006; H04W 74/0808; H04W 16/14; H04W 24/10
USPC .......................................................... 370/336
See application file for complete search history.

(56) References Cited

U.S. PATENT DOCUMENTS

| | | | | |
|---|---|---|---|---|
| 6,493,335 | B1* | 12/2002 | Darcie | H04L 12/2801 370/344 |
| 7,154,493 | B2* | 12/2006 | Yee | G09G 5/006 348/189 |
| 8,280,443 | B2* | 10/2012 | Tao | H04W 88/08 455/562.1 |
| 8,472,971 | B2* | 6/2013 | Rowe | H04W 64/00 342/464 |
| 8,498,282 | B2* | 7/2013 | Doi | H04W 74/04 370/310 |
| 8,618,854 | B2* | 12/2013 | Narathong | H03L 7/091 327/159 |
| 8,705,561 | B2* | 4/2014 | Ito | H04L 5/0007 370/344 |
| 9,019,991 | B1* | 4/2015 | Zhang | H04W 52/325 375/267 |
| 9,191,972 | B2* | 11/2015 | Kogawa | H04W 74/0808 |
| 9,398,615 | B1* | 7/2016 | Zhang | H04W 74/0816 |
| 9,467,886 | B2* | 10/2016 | Chang | H04W 24/10 |
| 9,490,867 | B2* | 11/2016 | Voglewede | H04B 1/7077 |
| 9,775,087 | B2* | 9/2017 | Chou | H04W 16/14 |
| 9,854,484 | B2* | 12/2017 | Tsuboi | H04W 36/0072 |
| 10,034,306 | B2* | 7/2018 | Goto | H04W 56/0015 |
| 10,097,149 | B2* | 10/2018 | Voix | H04R 1/1016 |
| 10,447,414 | B2* | 10/2019 | Briggs | H04W 4/02 |
| 10,448,346 | B2* | 10/2019 | Abedini | H04L 27/2666 |
| 10,536,931 | B2* | 1/2020 | Goto | H04W 72/0446 |
| 10,595,211 | B2* | 3/2020 | Adachi | H04W 84/12 |
| 10,673,593 | B2* | 6/2020 | Cao | H04L 1/1614 |
| 10,735,992 | B2* | 8/2020 | Park | H04L 5/0055 |
| 10,841,060 | B2* | 11/2020 | Yi | H04L 5/0053 |
| 10,917,864 | B2* | 2/2021 | Zhang | H04B 7/26 |
| 10,979,250 | B2* | 4/2021 | Li | H04L 25/0224 |
| 11,129,145 | B2* | 9/2021 | Noh | H04B 7/0417 |
| 11,140,695 | B1* | 10/2021 | Eyuboglu | H04W 72/535 |
| 11,206,549 | B1* | 12/2021 | Eyuboglu | H04W 72/1273 |
| 11,212,051 | B2* | 12/2021 | Bhattad | H04W 24/10 |
| 11,271,699 | B1* | 3/2022 | Eyuboglu | H04J 11/0079 |
| 11,375,527 | B1* | 6/2022 | Eyuboglu | H04B 7/15528 |
| 11,424,799 | B2* | 8/2022 | Meng | H04L 5/005 |
| 11,627,586 | B2* | 4/2023 | Adachi | H04W 74/002 370/329 |
| 11,683,112 | B1* | 6/2023 | Kecicioglu | H04J 11/0069 370/350 |
| 11,690,027 | B2* | 6/2023 | Sundman | H04W 52/42 370/329 |
| 2004/0108954 | A1* | 6/2004 | Richley | G01S 5/0226 342/465 |
| 2018/0249374 | A1* | 8/2018 | Park | H04L 5/00 |
| 2018/0270815 | A1* | 9/2018 | Bala | H04J 3/1694 |
| 2018/0317092 | A1* | 11/2018 | Harada | H04L 5/0053 |
| 2019/0394798 | A1* | 12/2019 | Tomeba | H04W 74/02 |
| 2020/0059852 | A1* | 2/2020 | Urabayashi | H04W 48/10 |
| 2020/0084673 | A1* | 3/2020 | Ahmadi | H04W 16/14 |
| 2021/0051586 | A1* | 2/2021 | Namba | H04L 1/0003 |
| 2021/0051718 | A1* | 2/2021 | Bhattad | H04W 72/23 |
| 2021/0176736 | A1* | 6/2021 | Harada | H04W 16/14 |

OTHER PUBLICATIONS

ETSI EN 301 893 V2.1.1, "5 GHz RLAN; Harmonised Standard covering the essential requirements of article 3.2 of Directive 2014/53/EU," May 2017, 122 pages.

InterDigital Inc., "Discussion on Procedures for Initial Access and Mobility in NR-U," R1-1813221, Agenda Item: 7.2.2.4.2, 3GPP TSG RAN WGI Meeting #95, Spokane, USA, Nov. 12-16, 2018, 11 pages.

International Search Report, dated Oct. 15, 2019, for corresponding International Application No. PCT/JP2019/033771, 4 pages.

Panasonic, "DL signals and channels for NR-U," R1-1902530, Agenda Item: 7.2.2.1.2, 3GPP TSG-RAN WG1 #96, Athens, Greece, Feb. 25-Mar. 1, 2019, 6 pages.

* cited by examiner

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command; for reporting on PUSCH, the UE receives triggering on DCI | Triggered by DCI; additionally, activation command |
| Semi-Persistent CSI-RS | Not supported | For reporting on PUCCH, the UE receives an activation command; for reporting on PUSCH, the UE receives triggering on DCI | Triggered by DCI; additionally, activation command |
| Aperiodic CSI-RS | Not supported | Not supported | Triggered by DCI; additionally, activation command |

| Signaling value | The shift amount [slot] (to earlier in time domain) |
| --- | --- |
| 00 | 0 |
| 01 | 1 |
| 10 | 2 |
| 11 | 3 |

FIG. 11

| Signaling value | The shift amount [slot] (to later in time domain) |
| --- | --- |
| 00 | 0 |
| 01 | 1 |
| 10 | 2 |
| 11 | 3 |

FIG. 12

| Signaling value | Initial symbol indication | | | |
| --- | --- | --- | --- | --- |
| | DL (to later) (for CSI reporting) | | UL (to earlier) (for CSI transmission) | |
| | Slot | Symbol | Slot | Symbol |
| 000 | 0 | At the beginning of the DL burst | 0 | At the beginning of the UL burst |
| 001 | 0 | At the end of the DL burst | 0 | At the end of the UL burst |
| 010 | 1 | At the beginning of the DL burst | 1 | At the beginning of the UL burst |
| 011 | 1 | At the end of the DL burst | 1 | At the end of the UL burst |
| 100 | 2 | At the beginning of the DL burst | 2 | At the beginning of the UL burst |
| 101 | 2 | At the end of the DL burst | 2 | At the end of the UL burst |
| 110 | 3 | At the beginning of the DL burst | 3 | At the beginning of the UL burst |
| 111 | 3 | At the end of the DL burst | 3 | At the end of the UL burst |

FIG. 13

BASE STATION, TERMINAL AND COMMUNICATION METHOD

TECHNICAL FIELD

The present disclosure relates to a base station, a terminal and a communication method.

BACKGROUND ART

In the standardization of the 5th generation mobile communication system (5G), 3GPP has discussed New Radio Access Technology (NR), which is not necessarily backward compatible with LTE/LTE-Advanced.

In NR, the operation (also referred to as NR-U or NR-based Access to Unlicensed Spectrum) in the unlicensed band (also referred to as unlicensed spectrum) has been discussed as in LTE-License-Assisted Access(LTE-LAA). In LTE-LAA, the operation in the unlicensed band accompanying with the operation in the licensed band has been supported. On the other hand, in NR, it is required to realize the operation in the unlicensed band (Stand-alone operation) without using the licensed band.

In LTE-LAA, a base station (e.g., also referred to as "eNB" or "gNB") uses a particular radio resource to transmit a reference signal which is referred to as a Channel State Information-Reference Signal (hereinafter, referred to as "CSI-RS transmit" or "CSI-RS transmission"). A terminal (e.g., also referred to as "User Equipment") measures the downlink quality in the CSI-RS transmission band by measuring the reception quality of the CSI-RS. Then, the terminal indicates (in other words, reports) the measurement result of the CSI-RS to the base station (hereinafter, also referred to as "CSI report," "CSI reporting," or "CSI-RS reporting").

CITATION LIST

Non-Patent Literature

NPL 1
  3GPP TS 38.214 V15.3.0, "NR; Physical layer procedures for data (Release 15)," September 2018
NPL 2
  ETSI EN 301 893 V2.1.1, "5 GHz RLAN; Harmonised Standard covering the essential requirements of article 3.2 of Directive 2014/53/EU," May 2017

SUMMARY OF INVENTION

However, a transmission method for transmitting a reference signal and a report of reception quality measured using the reference signal in an unlicensed band has not been studied enough.

One non-limiting and exemplary embodiment facilitates providing a base station, a terminal and a communication method capable of appropriately transmitting a reference signal and a report of reception quality measured using the reference signal in an unlicensed band.

In an embodiment, the techniques disclosed here feature a base station including: control circuitry, which, in operation, changes, based on a time resource configured according to a result of carrier sense, at least one timing of a transmission timing of a reference signal and a reporting timing of quality information measured using the reference signal in a terminal, the transmission timing and the reporting timing being configured prior to the carrier sense; and communication circuitry, which, in operation, performs communication of the reference signal or the quality information based on the changed timing.

It should be noted that general or specific embodiments may be implemented as a system, an apparatus, a method, an integrated circuit, a computer program, a storage medium, or any selective combination thereof.

According to an embodiment of the present disclosure, it is possible to appropriately transmit a reference signal and a report of reception quality measured using the reference signal in an unlicensed band.

Additional benefits and advantages of the disclosed embodiments will become apparent from the specification and drawings. The benefits and/or advantages may be to individually obtained by the various embodiments and features of the specification and drawings, which need not all be provided in order to obtain one or more of such benefits and/or advantages.

BRIEF DESCRIPTION OF DRAWINGS

FIG. 1 is a diagram illustrating an example of a correspondence between CSI-RS transmission and CSI reporting;
FIG. 11 is a diagram illustrating examples of shift amounts in CSI-RS transmission according to determination method 3;
FIG. 12 is a diagram illustrating examples of shift amounts in CSI reporting according to determination method 3;
and
FIG. 13 is a diagram illustrating examples of shift amounts in CSI-RS transmission and CSI reporting according to determination method 3;

DESCRIPTION OF EMBODIMENTS

Figure 2:
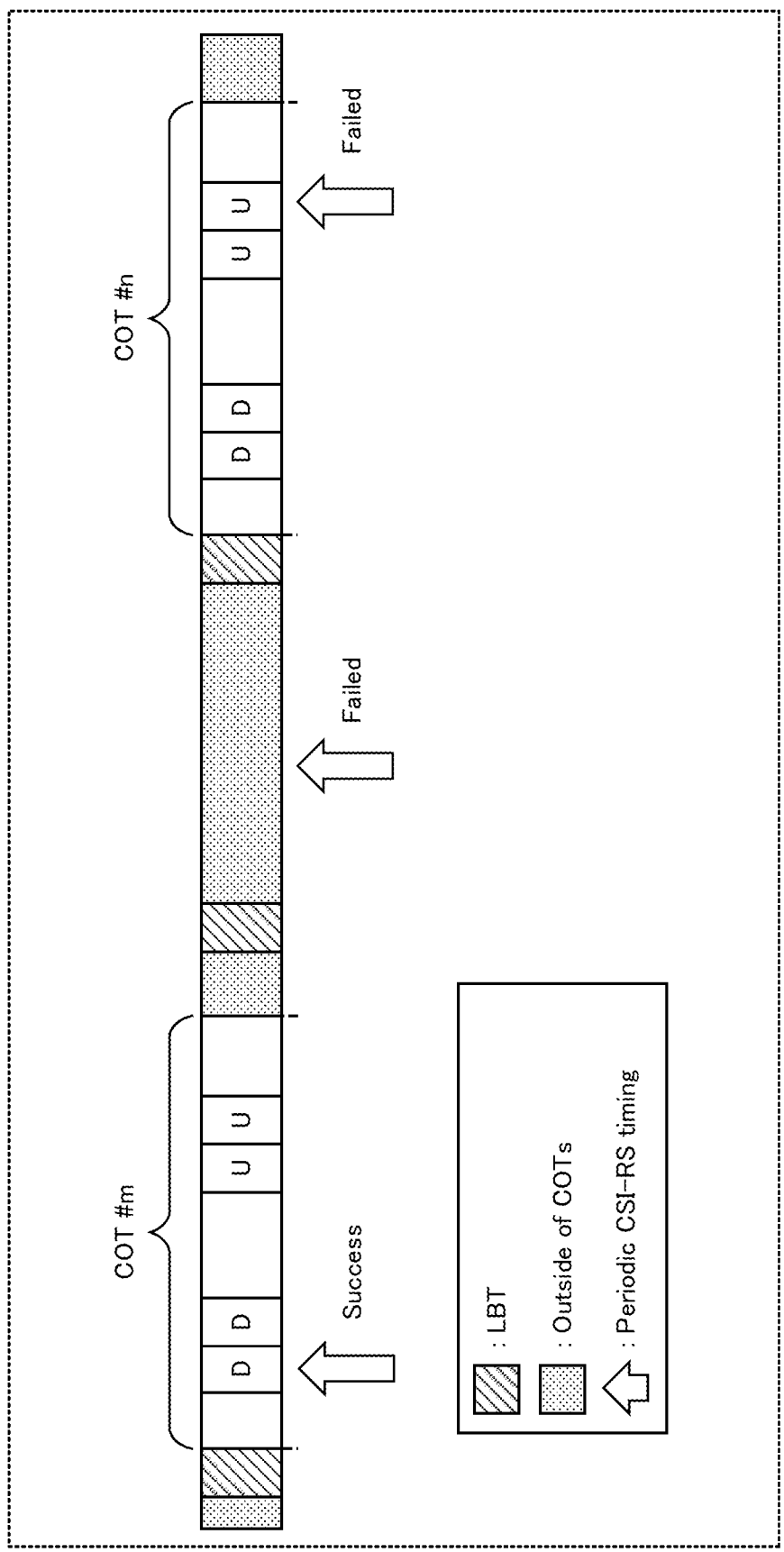
FIG. 2 is a diagram illustrating an example of CSI-RS transmission.

Embodiments of the present disclosure will be described in detail below by referring to the drawings.

For example, in LTE-LAA, a terminal measures received power using a CSI-RS included in a Discovery Reference Signal (DRS), and reports a measurement result as a CSI Reference Signal Received Power (CSI-RSRP) to a base station for radio resource management (e.g., Radio Resource Management (RRM)). Apart from the DRS, the terminal estimates downlink quality using a periodically transmitted CSI-RS alone, and reports an estimation result to the base station.

In the operation of the licensed band in NR, three types of transmission methods are supported: a periodic CSI-RS (Periodic CSI-RS); a semi-persistent CSI-RS (Semi-Persistent CSI-RS); and an aperiodic CSI-RS (Aperiodic CSI-RS) (see, for example, NPL 1).

Also in the operation in the unlicensed band in NR, it has been studied that a terminal measures downlink quality using a CSI-RS.

However, a method for transmitting a CSI-RS or for reporting a measurement result (or estimation result) using a CSI-RS in an unlicensed band in which an interval during which a base station or a terminal cannot transmit a signal occurs has not been discussed enough. Then, an exemplary method for transmitting a CSI-RS or for reporting a measurement result (or estimation result) using a CSI-RS in an unlicensed band will be described below.

[CSI-RS Transmission]

In NR, configurations regarding transmission of a Periodic CSI-RS and a Semi-Persistent CSI-RS from a base station to a terminal (e.g., a transmission periodicity and a slot offset) are determined by higher layer signaling (e.g., Radio Resource Control (RRC)) and transmitted from the base station to the terminal at a regular period of time. Further, for the Semi-Persistent CSI-RS, activation or deactivation of CSI-RS transmission based on the above configurations is indicated from the base station to the terminal by downlink control information (e.g., Downlink Control Information (DCI)).

Further, in NR, for transmission of an Aperiodic CSI-RS from a base station to a terminal, for example, transmission configuration candidates (for example, referred to as Trigger States) are preconfigured to the terminal by higher layer signaling, and CSI-RS transmission based on any of the transmission configuration candidates is triggered by downlink control information.

[CSI Reporting]

On the other hand, for reporting of a measurement result of a CSI-RS from a terminal to a base station (CSI reporting), three types of methods are supported: periodic reporting (Periodic CSI reporting); semi-persistent reporting (Semi-persistent CSI reporting); and aperiodic reporting (Aperiodic CSI reporting).

For example, the above three types of CSI reporting are configured according to the corresponding method for transmitting the CSI-RS. FIG. 1 illustrate an example of a correspondence between CSI-RS transmission and CSI reporting.

As illustrated in FIG. 1, all types of the Periodic CSI reporting, the Semi-Persistent CSI reporting, and the Aperiodic CSI reporting can be configured for the CSI reporting for the Periodic CSI-RS transmission. On the other hand, the Periodic CSI reporting is not supported and the Semi-Persistent CSI reporting or the Aperiodic CSI reporting can be configured for the CSI reporting for the Semi-Persistent CSI-RS transmission. In addition, the Periodic CSI reporting and the Semi-persistent CSI reporting are not supported and the Aperiodic CSI reporting can be configured for the CSI reporting for the Aperiodic CSI-RS transmission.

Periodic CSI reporting is transmitted using an uplink control channel (e.g., Physical Uplink Control Channel (PUCCH)). Configurations of the Periodic CSI reporting are configured by higher layer signaling, for example.

Also, Aperiodic CSI reporting is transmitted using an uplink data channel (e.g., Physical Uplink Shared Channel (PUSCH)). For configurations of the Aperiodic CSI reporting, configuration candidates are indicated to a terminal in advance by higher layer signaling as with configurations of Aperiodic CSI-RS transmission, for example, and reporting based on any of the configuration candidates is triggered by downlink control information.

Further, Semi-persistent CSI reporting supports both of a method using a PUCCH and a method using PUSCH, which are similar to a configuration method for Periodic CSI reporting and a configuration method for Aperiodic CSI reporting, respectively. In addition, for example, when a transmission timing of Semi-persistent CSI reporting configured in a PUCCH and a transmission timing of a PUSCH (e.g., uplink data signal) overlap in the same terminal, Semi-persistent CSI reporting may be multiplexed with the PUSCH and transmitted (also referred to as "piggybacked and transmitted").

[Carrier Sense]

Generally, in an unlicensed band, when a radio device detects another entity in the unlicensed band in performing communication, the radio device is prohibited from performing transmission in the unlicensed band (see, for example, NPL 2). Therefore, LTE-LAA supports that a base station or a terminal performs carrier sense (e.g., Listen Before Talk (LBT)) at the beginning of transmission. Support for LBT has been also studied in the operation of the unlicensed band in NR.

In LBT, a base station or a terminal searches for a target unlicensed band (or channel) at a timing by predetermined time prior to a transmission timing of a signal before transmitting the signal, for example, and confirms whether or not another device (e.g., a base station, a terminal, or a Wi-Fi (registered trademark) device) is communicating in the band. As a result of the LBT, the base station or the terminal uses the unlicensed band for communication for which it has been confirmed that the other device is not communicating.

Further, for a band once determined to be usable by LBT, a transmittable time (e.g., referred to as Channel Occupancy Time (COT)) is configured. The base station or the terminal is allowed to transmit a signal in the COT, and performs LBT again with respect to communication after the elapse of the COT.

In the operation of the unlicensed band in NR, it has been being studied that COT structure information indicating a structure of a COT and slot format information (Slot Format Information (SFI)) indicating a slot format of each COT are configured to a terminal after determination of a used band by LBT.

Here, the COT structure information may include, for example, a maximum COT length and the like. When the maximum COT length is indicated by the COT configuration information from a base station to a terminal, the terminal may determine a time within the maximum COT length to be a time within the COT. The slot format refers to allocation configurations of Downlink communication and Uplink communication for respective symbols in a slot.

Thus, in the operation of the unlicensed band in NR, it is assumed that the slot format in the COT (for example, whether each symbol can be used for Downlink communication or Uplink communication) is determined after the configuration of the used band by the LBT.

[CSI-RS Transmission and CSI Reporting in Unlicensed Band]

As described above, in any of the three types (Periodic, Semi-Persistent and Aperiodic) of CSI-RS transmission and CSI reporting, candidate locations for allocation of resources (hereinafter, sometimes collectively referred to as "CSI-RS resources") used for transmission, measurement, and reporting for a CSI-RS (in other words, CSI-RS transmission, CSI measurement, and CSI reporting) are indicated to a terminal by higher layer signaling (e.g., RRC) in NR.

On the other hand, as described above, in an unlicensed band, a base station or a terminal cannot perform communication unless a clear region in the band can be confirmed as a result of performing LBT immediately before the communication. In addition, even if a clear region in the band can be confirmed as a result of LBT, a communication time is limited to within a configured COT length.

Further, as described above, it is assumed that a slot format of a band for which communication is determined to be transmittable by LBT is indicated from a base station to a terminal after a used band is configured by the LBT.

Therefore, allocation of CSI-RS resources in the unlicensed band needs to be determined based on a determination result of a band state by LBT, a COT structure, and a slot format determined after configuration of an used band by the LBT.

However, as described above, since the allocation of the CSI-RS resources is indicated to the terminal by higher layer signaling, it may not be possible to flexibly address variation in time in the COT length and the slot format configured after the LBT, for example. In other words, allocation of periodic CSI-RS resources by the higher layer signaling does not take into account a check result of the usage state or the slot format configuration by the LBT for the allocated resources. Therefore, there is a possibility that in the unlicensed band, CSI-RS resources cannot be secured adequately. Alternatively, in the unlicensed band, a CSI-RS resource may be incorrectly configured for a resource for which transmission, measurement, and reporting for a CSI-RS cannot be performed.

For example, for transmission, measurement, and reporting of Periodic and Semi-Persistent (but when activated) CSI-RSs, resources (e.g., transmission timings or reporting timings) are allocated periodically in the time direction by higher layer signaling. In this case, the transmission, measurement, and reporting for the CSI-RSs are possible when in all to of the allocated resources, there are clear regions in a band corresponding to the resources by LBT, the timing of the CSI-RS transmission and the timing of the CSI reporting are included in a configured COT, and the transmission, measurement, and reporting for the CSI-RSs are configured to be performable in all of the slot formats (e.g., downlink and uplink communication configurations for respective symbols).

FIG. 2 illustrates exemplary operations for transmission, measurement, and reporting for a Periodic (or Semi-persistent) CSI-RS. As illustrated in FIG. 2, a transmission timing (in other words, CSI-RS resource) of a Periodic CSI-RS is periodically allocated in the time direction by higher layer signaling. Also, in FIG. 2, as a result of each LTB, COT #m and COT #n are configured, and a symbol structure (e.g., downlink (DL) symbol (denoted as "D") or uplink (UL) symbol (denoted as "U") is configured in a slot format within each COT.

In the example illustrated in FIG. 2, for example, in COT #m, a resource corresponding to a transmission timing of the Periodic CSI-RS is configured for a DL symbol (D). Therefore, a base station can transmit the Periodic CSI-RS in the DL symbol.

On the other hand, in the example illustrated in FIG. 2, the base station cannot transmit the Periodic CSI-RS during a period between COT #m and COT #n, that is, at a transmission timing of the Periodic CSI-RS allocated outside the COT. Further, in the example illustrated in FIG. 2, for example, in COT #n, a resource corresponding to a transmission timing of the Periodic CSI-RS is configured for a UL symbol (U). Therefore, the base station cannot transmit the Periodic CSI-RS as a downlink signal in the UL symbol.

In addition, for transmission, measurement, and reporting for an Aperiodic CSI-RS, the transmission, measurement, and reporting for the CSI-RS are performed based on any configuration selected by downlink control data among from candidates configured by higher layer signaling.

Resource allocation of an Aperiodic CSI-RS by higher layer signaling does not take into account a check result of a usage state or a slot format configuration by LBT for the allocated resources as with transmission, measurement, and reporting for Periodic and Semi-Persistent CSI-RSs. Therefore, in an unlicensed band, a CSI-RS resource may be incorrectly configured for a resource for which transmission, measurement, and reporting for a CSI-RS cannot be performed.

Also, for example, Aperiodic CSI reporting is configured to a terminal for transmitting the CSI reporting to a base station after prescribed computation time since triggering by DCI.

Figure 3:
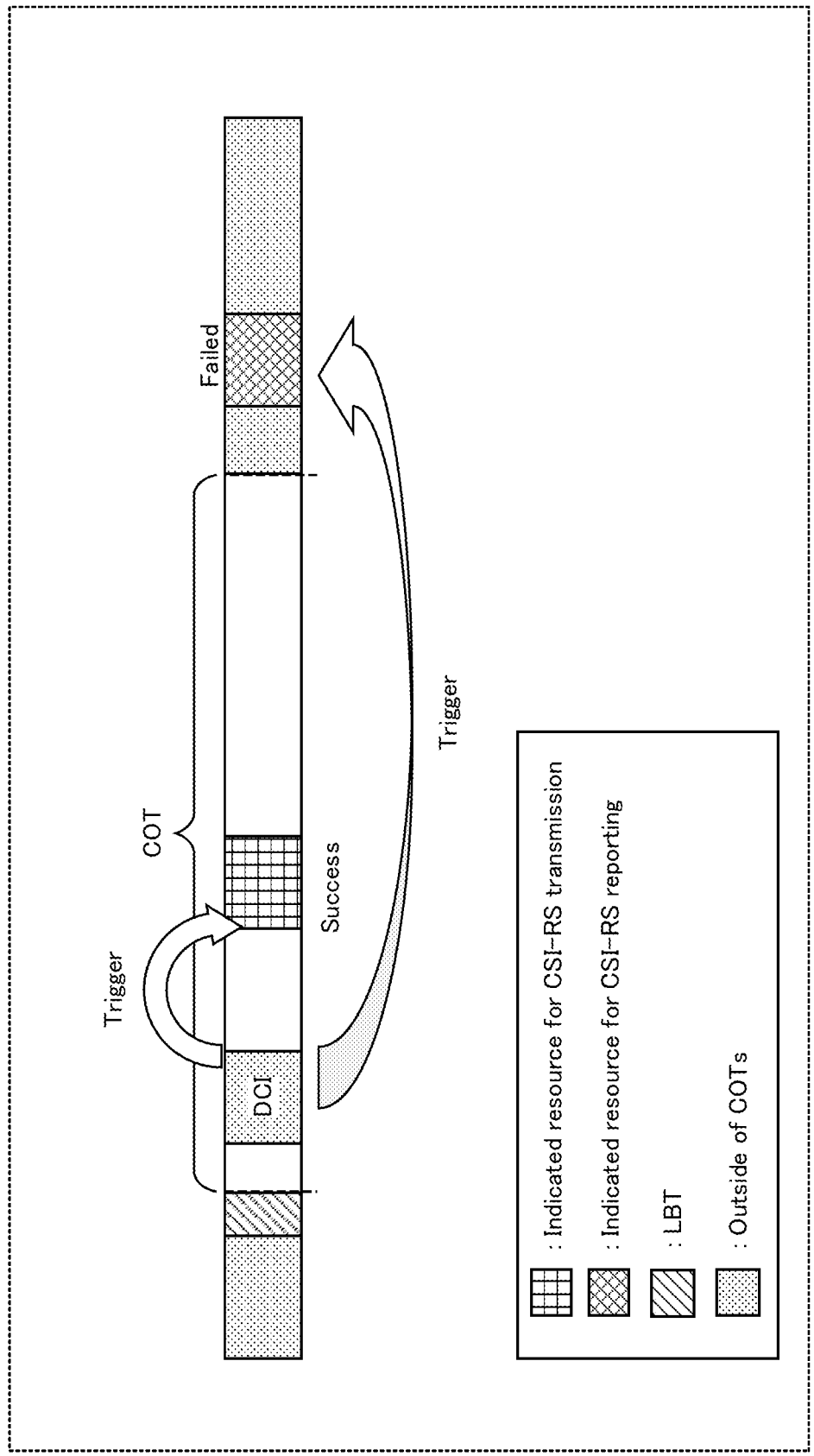
FIG. 3 is a diagram illustrating an example of CSI reporting.

However, in an unlicensed band, as described above, a COT length is limited. Therefore, a resource (e.g., reporting timing) for the configured CSI reporting may be outside the COT. FIG. 3 illustrates exemplary operations for transmission, measurement, and reporting for an Aperiodic CSI-RS.

In the example illustrated in FIG. 3, a transmission timing of an Aperiodic CSI-RS triggered by DCI is within a COT configured based on a result of LTB. Thus, a base station can transmit the Aperiodic CSI-RS at the transmission timing triggered by the DCI. On the other hand, in the example illustrated in FIG. 3, a transmission timing of Aperiodic CSI reporting triggered by the DCI is outside the COT configured based on the result of the LTB. Therefore, a terminal cannot transmit the Aperiodic CSI reporting.

As described above, for allocation of CSI-RS resources by higher layer signaling, it may not be possible to flexibly address a COT length and a slot format determined after a state check result of an used band or a configuration of an used band by dynamically varying LBT.

In an exemplary embodiment of the present disclosure, a method for appropriately performing transmission, measurement, and reporting for a CSI-RS in the operation of the unlicensed band will be described.

[DMTC]

A CSI-RS can be included in a DRS in LTE-LAA. Resources are periodically allocated to the DRS. However, as described above, depending on a result of LBT, a base station may not be able to transmit the DRS in the allocated resource. Therefore, in LTE-LAA, for example, DRS transmittable time (e.g., referred to as DRS Measurement Timing Configuration (DMTC)) is provided in each DRS cycle. Transmission of the DRS at any timing in the DMTC is supported. Note that a timing at which a base station transmits the DRS within the DMTC is not indicated to a terminal, and the terminal continues to monitor in the DMTC.

Embodiment 1

[Overview of Communication System]

A communication system according to the present embodiment includes base station 100 and terminal 200.

Figure 4:
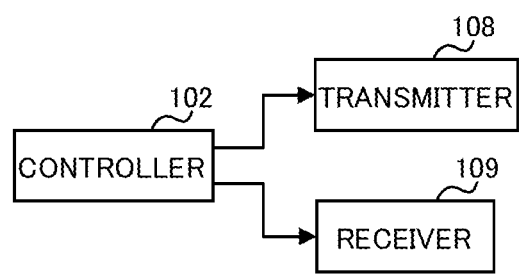
FIG. 4 is a block diagram illustrating an exemplary configuration of a part of a base station.

FIG. 4 is a block diagram illustrating an exemplary configuration of a part of base station 100 according to the present embodiment. In base station 100 illustrated in FIG. 4, controller 102 (corresponding to control circuitry)

changes, based on a time resource (e.g., a COT structure or a slot format) configured according to a result of carrier sense, at least one timing of a transmission timing of a reference signal (e.g., CSI-RS) and a reporting timing of quality information (e.g., CSI) measured using the reference signal in terminal 200, which are configured prior to the carrier sense. Transmitter 108 and receiver 109 (corresponding to communication circuitry) perform communication of the reference signal or the quality information based on the changed timing.

Figure 5:
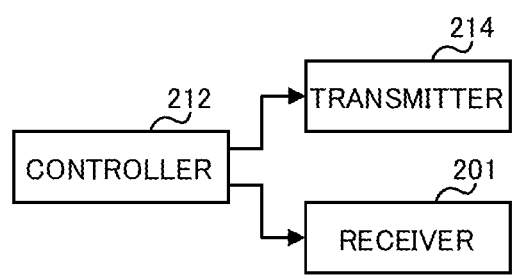
FIG. 5 is a block diagram illustrating an exemplary configuration of a part of a terminal.

FIG. 5 is a block diagram illustrating an exemplary configuration of a part of terminal 200 according to the present embodiment. In terminal 200 illustrated in FIG. 5, controller 102 (corresponding to control circuitry) changes, based on a time resource (e.g., a COT structure or a slot format) configured according to a result of carrier sense, at least one timing of a transmission timing of a reference signal (e.g., CSI-RS) from base station 100 and a reporting timing of quality information (e.g., CSI) measured using the reference signal, which are configured prior to the carrier sense. Receiver 201 and transmitter 214 (corresponding to communication circuitry) perform communication of the reference signal or the quality information based on the changed timing.

[Configuration of Base Station]

Figure 6:
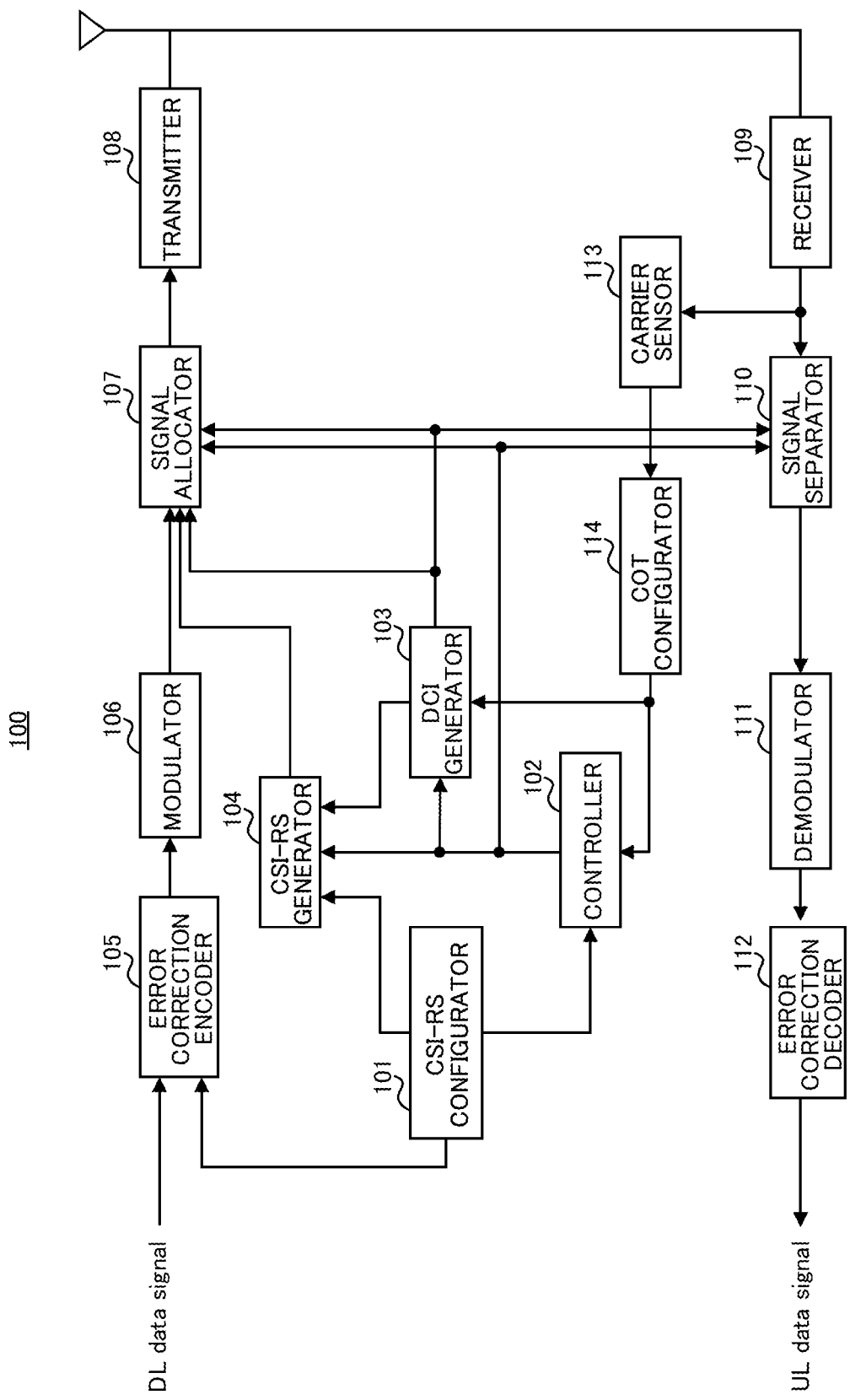
FIG. 6 is a block diagram illustrating an exemplary configuration of the base station.

FIG. 6 is a block diagram illustrating an exemplary configuration of base station 100 according to the present embodiment. In FIG. 6, base station 100 includes CSI-RS configurator 101, controller 102, DCI generator 103 CSI-RS generator 104, error correction encoder 105, modulator 106, signal allocator 107, transmitter 108, receiver 109, signal separator 110, demodulator 111 error correction decoder 112, carrier sensor 113, and COT configurator 114.

For example, CSI-RS configurator 101 configures parameters regarding a CSI-RS (for example, parameters regarding transmission, measurement, and reporting for the CSI-RS such as a CSI-RS resource), and generates CSI-RS configuration information indicating the configured parameters. CSI-RS configurator 101 outputs the CSI-RS configuration information to controller 102 and CSI-RS generator 104. CSI-RS configurator 101 also outputs the CSI-RS configuration information to error correction encoder 105 as higher layer signaling (or referred to as higher layer signal).

Controller 102 controls, for example, at least one of a timing of CSI-RS transmission and a timing of CSI reporting based on the CSI-RS configuration information input from CSI-RS configurator 101 and COT configuration information input from COT configurator 114 (an example of which will be described later). Controller 102 outputs timing information indicating the configured timing of the CSI-RS transmission and the configured timing of the CSI reporting to, for example, CSI-RS generator 104, signal allocator 107 and signal separator 110. In addition, controller 102 outputs resource information indicating, for example, configurations (e.g., including configurations different from the timing information) regarding the CSI-RS transmission and the CSI reporting indicated in the CSI-RS configuration information to signal allocator 107 and signal separator 110.

Controller 102 may also output the timing information to DCI generator 103 when indicating the configured timing information to terminal 100 (see, for example, determination method 3 to be described later).

Note that an example of a method for configuring the timing of the CSI-RS transmission and the timing of the CSI reporting in controller 102 will be described later.

DCI generator 103 generates DCI, which is a control signal indicating allocation information indicating allocation of downlink data (e.g., DL data) or uplink data (e.g., UL data), based on, for example, the COT configuration information input from COT configurator 114 or the timing information input from controller 102. Note that the control information indicated in the DCI may include information on the CSI-RS transmission or the CSI reporting (e.g., information indicating activation or deactivation in the Semi-persistent operation or triggering in the Aperiodic operation).

DCI generator 103 outputs the DCI as transmission data to signal allocator 107. DCI generator 103 also outputs the allocation information of the DL data (e.g., including the resource information regarding the CSI-RS transmission) as the control signal to signal allocator 107. DCI generator 103 also outputs the allocation information of the UL data (e.g., including the resource information regarding the CSI reporting) as the control signal to signal separator 110. In addition, DCI generator 103 outputs allocation information (e.g., activation information or triggering information) on a CSI-RS as a control signal to CSI-RS generator 104.

CSI-RS generator 104 generates the CSI-RS transmitted from base station 100 to terminal 200 based on the CSI-RS configuration information input from CSI-RS configurator 101, the timing information input from controller 102, and the control information input from DCI generator 103. CSI-RS generator 104 outputs the generated CSI-RS to signal allocator 107.

Error correction encoder 105 receives the transmission data signal (DL data signal) and higher layer signaling input from CSI-RS configurator 101 as an input, performs error correction encoding on the input signal, and outputs the encoded signal to modulator 106.

Modulator 106 performs modulation processing on the signal input from error correction encoder 105, and outputs the modulated data signal to signal allocator 107.

Signal allocator 107, based on, for example, the allocation information input from DCI generator 103 and the control information input from controller 102, allocates the DL signal (in other words, the transmission signal) including at least one of the data signal (e.g., DL data signal or higher layer signaling) input from modulator 106, the DCI input from DCI generator 103, and the CSI-RS input from CSI-RS generator 104 to a resource. The formed transmission signal is output to transmitter 108.

Transmitter 108 performs radio transmission processing such as up-conversion on the signal input from signal allocator 107, and performs transmission to terminal 200 via an antenna.

Receiver 109 receives a signal transmitted from terminal 200 via the antenna, performs radio reception processing such as down-conversion on the signal, and outputs the processed signal to signal separator 110 and carrier sensor 113.

Signal separator 110 separates the signal input from receiver 109 based on, for example, the control information input from controller 102 and the allocation information input from DCI generator 103. Signal separator 110 outputs the separated data signal (e.g., UL data signal) to demodulator 111. Signal separator 110 also outputs the separated CSI reporting signal to a processer (e.g., scheduler) not illustrated.

Demodulator 111 performs demodulation processing on the signal input from signal separator 110, and outputs the obtained signal to error correction decoder 112.

Error correction decoder 112 decodes the signal input from demodulator 111, and obtains received data signal (UL data signal) from terminal 200.

When carrier sensor 113 confirms (i.e., investigates or searches for) a usage state of a band by LBT, carrier sensor 113 uses the signal input from receiver 109 to investigate the usage state of the band by the LBT, and determines the band used by base station 100 for communication. Carrier sensor 113 outputs the determination result to COT configurator 114.

COT configurator 114 configures parameters regarding a COT configured for the band usable for communication by base station 100 based on the determination result of the usage state of the band input from carrier sensor 113. The parameters regarding the COT may include, for example, a COT length (or maximum COT length) and a slot format (in other words, a symbol configuration within the COT). The COT configurator 114 outputs COT configuration information (or referred to as COT structure information) indicating the configured parameters regarding the COT to controller 102 and DCI generator 103.

[Configuration of Terminal]

Figure 7:
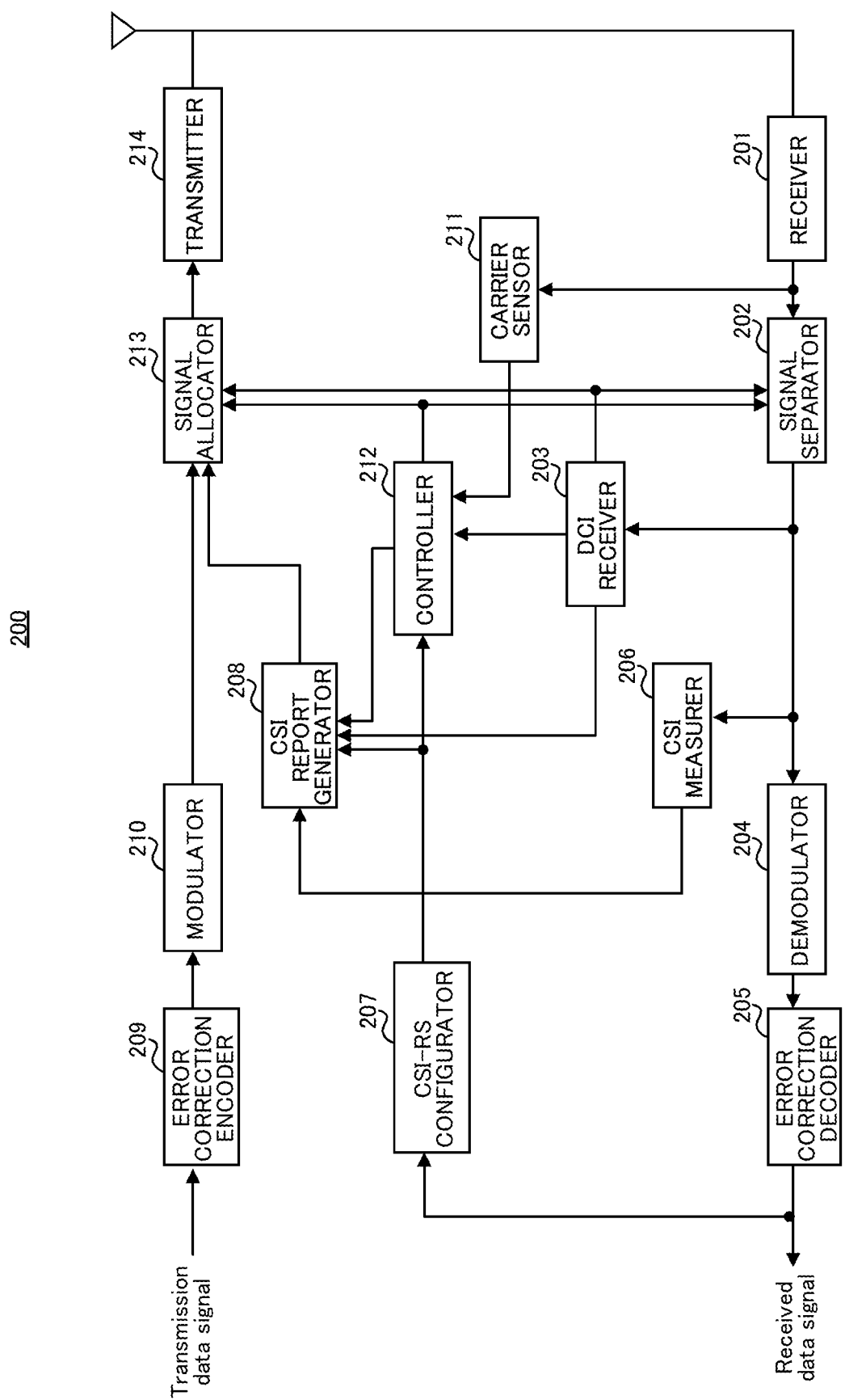
FIG. 7 is a block diagram illustrating an exemplary configuration of the terminal.

FIG. 7 is a block diagram illustrating an exemplary configuration of terminal 200 according to the present embodiment. In FIG. 7, terminal 200 includes receiver 201, signal separator 202, DCI receiver 203, demodulator 204, error correction decoder 205, CSI measurer 206, CSI-RS configurator 207, CSI report generator 208, error correction encoder 209, modulator 210, carrier sensor 211, controller 212, signal allocator 213, and transmitter 214.

Receiver 201 receives a reception signal via an antenna, performs reception processing such as down-conversion on the signal, and outputs the processed signal to signal separator 202 and carrier sensor 211.

Signal separator 202 separates signal components corresponding to positions (in other words, search space) of downlink control channel (e.g., Physical Downlink Control Channels (PDCCH)) candidates among the signal input from receiver 201, and outputs the separated signal components to DCI receiver 203. Signal separator 202 also separates a DL signal (for example, DL data signal or higher layer signaling) from the signal input from receiver 201 based on allocation information input from DCI receiver 203, and outputs the DL signal to demodulator 204.

Further, signal separator 202 separates a CSI-RS from the signal input from receiver 201 based on CSI-RS configuration information input from DCI receiver 203 and timing information input from controller 212, and outputs the CSI-RS to CSI measurer 206.

DCI receiver 203 monitors (in other words, blind decodes) the signal components input from signal separator 202 to detect DCI addressed to terminal 200. DCI receiver 203 decodes and receives the DCI detected by the monitoring. Among the decoded DCI, DCI receiver 203 outputs the DL allocation information to signal separator 202, outputs UL allocation information to signal allocator 213, and outputs COT configuration information to CSI report generator 208 and controller 212.

Demodulator 204 performs demodulation processing on the signal input from signal separator 202, and outputs the obtained demodulated signal to error correction decoder 205.

Error correction decoder 205 decodes the signal input from demodulator 204, outputs the obtained higher layer signaling to CSI-RS configurator 207, and outputs the obtained received data signal.

CSI measurer 206 measures, for example, downlink quality (or reception quality) in a transmission band of the CSI-RS using the CSI-RS input from signal separator 202.

CSI measurer 206 outputs CSI information indicating the measurement result to CSI report generator 208.

CSI-RS configurator 207 detects configurations (e.g., CSI-RS resources) of transmission, measurement, and reporting for the CSI-RS configured in base station 100 based on the higher layer signaling input from error correction decoder 205, and maintains the detected configurations as CSI-RS configuration information in terminal 200. CSI-RS configurator 207 outputs the CSI-RS configuration information to CSI report generator 208 and controller 212.

CSI report generator 208 generates a CSI reporting signal to be transmitted to base station 100 based on the CSI information input from CSI measurer 206, the CSI-RS configuration information input from CSI-RS configurator 207, the control information input from DCI receiver 203, and the control information input from controller 212. CSI report generator 208 outputs the generated CSI reporting signal to signal allocator 213.

Error correction encoder 209 receives transmission data signal (UL data signal) as an input, performs error correction encoding processing on the transmission data signal, and outputs the encoded signal to modulator 210.

Modulator 210 modulates the signal input from error correction encoder 209, and outputs the modulated signal to signal allocator 213.

When carrier sensor 211 confirms (i.e., investigates or searches for) a usage state of a band by LBT, carrier sensor 211 uses the signal input from receiver 201 to investigate the usage state of the band by the LBT, and determines the band used by base station 100 for communication. Carrier sensor 211 outputs the determination result to controller 212.

Controller 212 controls, for example, at least one of a reception timing of the CSI-RS and a transmission timing of the CSI reporting signal based on the CSI-RS configuration information input from CSI-RS configurator 207, the COT configuration information input from DCI receiver 203, and the determination result input from carrier sensor 211. Controller 212 outputs timing information indicating the configured reception timing of the CSI-RS and the configured transmission timing of the CSI reporting signal to, for example, CSI-RS report generator 208, signal separator 202 and signal allocator 213. Controller 212 also outputs resource information indicating, for example, configurations (e.g., including configurations different from the timing information) regarding the CSI-RS transmission and the CSI reporting indicated in the CSI-RS configuration information to signal separator 202 and signal allocator 213.

Further, when receiving the DCI including the timing information of the CSI-RS transmission and the CSI reporting from base station 100 (see, for example, determination method 3 to be described later), controller 212 may determine the timing of the CSI-RS and the timing of the CSI report based on the timing information input from DCI receiver 203.

Note that an example of a method for configuring the reception timing of the CSI-RS and the transmission timing of the CSI report in controller 212 will be described later.

Signal allocator 213, based on the information input from DCI receiver 203 (e.g., allocation information) and the control information input from controller 212, identifies resources to allocate the UL signal. Signal allocator 213 allocates the signal input from modulator 210 (e.g., UL data signal) and the CSI reporting signal input from CSI report generator 208 to the specified resources, and outputs the signals to transmitter 214.

Transmitter 214 performs radio transmission processing such as up-conversion on the signal input from signal allocator 213, and transmits the signal via the antenna.

[Operations of Base Station 100 and Terminal 200]

Next, operations of base station 100 (see FIG. 6) and terminal 200 (see FIG. 7) will be described in detail.

Figure 8:
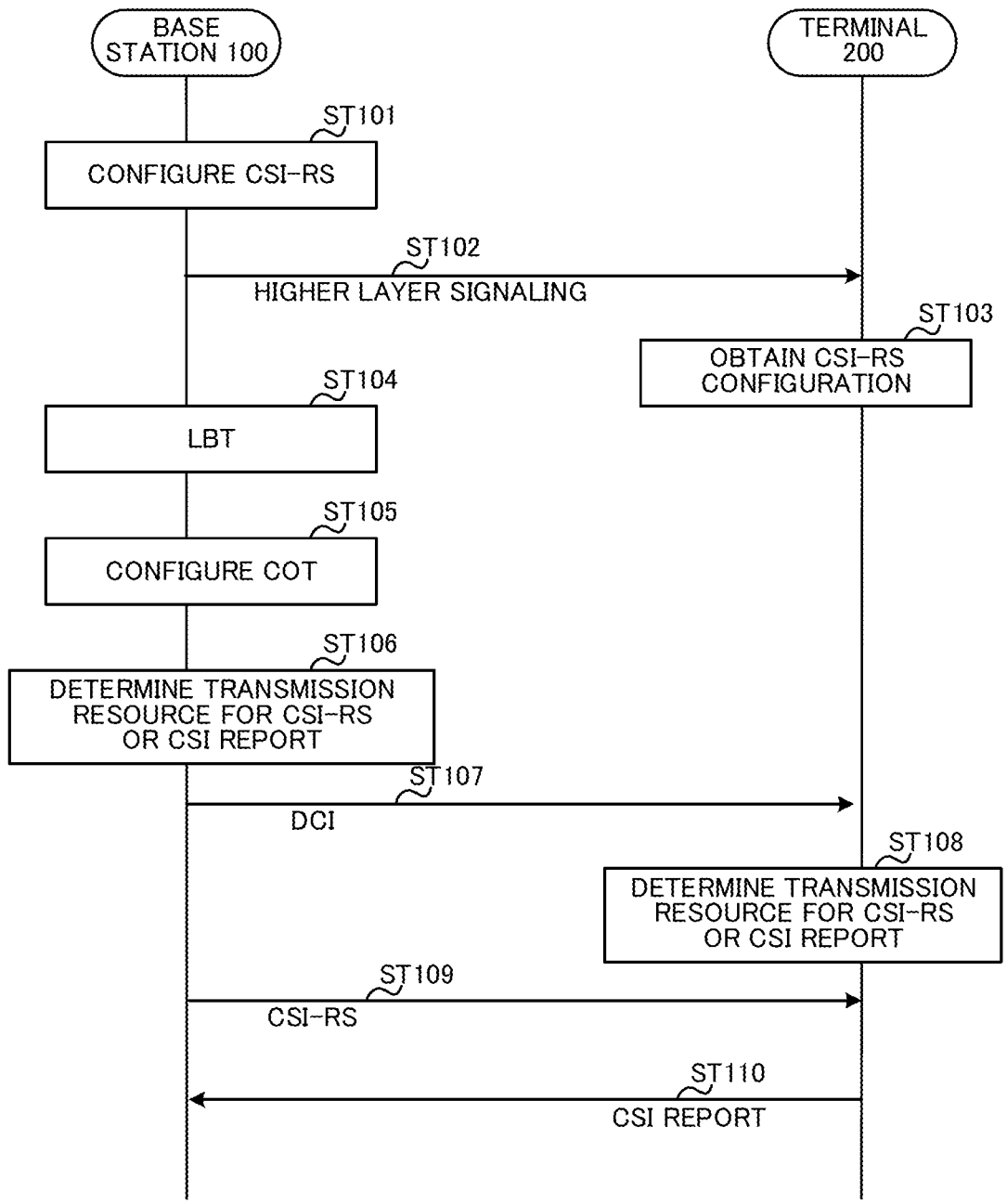
FIG. 8 is a sequence diagram illustrating exemplary operations of the base station and the terminal.

FIG. 8 is a sequence diagram illustrating an example of processing of base station 100 and terminal 200 according to the present embodiment.

In FIG. 8, base station 100 configures parameters regarding CSI-RS transmission and CSI reporting such as a CSI-RS resource (ST101). Base station 100 indicates (in other words, configures) CSI-RS configuration information including the configured parameters to terminal 200 by, for example, higher layer signaling (ST102). Terminal 200 obtains the CSI-RS configuration information indicated by the higher layer signaling (ST103).

Base station 100, for example, performs LBT (in other words, carrier sense) prior to starting communication in an unlicensed band (ST104).

Based on a result of the LBT, base station 100 configures, for example, a COT structure or a slot format within the COT (ST105).

For example, base station 100 determines a transmission resource (e.g., timing) of the CSI-RS or CSI report based on the CSI-RS configuration information and COT configuration information (ST106).

Base station 100 transmits, for example, DCI including the COT configuration information to terminal 200 (ST107). Note that the DCI may include information indicating the transmission resource of the CSI-RS or CSI report determined by base station 100 (see, for example, determination method 3 to be described later).

For example, as with base station 100, terminal 200 determines a transmission resource (e.g., timing) of a CSI-RS or CSI report based on CSI-RS configuration information and COT configuration information (ST 108). Alternatively, terminal 200 may determine the transmission resource of the CSI-RS or CSI report based on, for example, the transmission resource information indicated in the DCI from base station 100 (see, for example, determination method 3 to be described later).

Base station 100 transmits the CSI-RS (ST109). Terminal 200 transmits a CSI reporting signal generated using the CSI-RS transmitted from base station 100 to base station 100 (ST110).

Next, examples of determination method for determining a resource (in other words, transmission timing) to transmit a CSI-RS at base station 100 and a CSI report at terminal 200 will be described.

Base station 100 and terminal 200 determine a CSI-RS resource to be used for transmission, measurement, and reporting for a CSI-RS based on COT configurations (e.g., a COT length and a slot format structure in the COT) configured after confirmation of a usage state of a band by LBT (in other words, after carrier sense).

Thus, base station 100 and terminal 200 can determine a resource in which an interval where transmission cannot be performed may occur in an unlicensed band is avoided (for example, an interval outside the COT or an interval where transmission cannot be performed due to the symbol structure of the slot format). Therefore, it is possible to guarantee the nearly same opportunities of the transmission, measurement, and reporting for the CSI-RS even in the unlicensed band as those in the license band.

In the present embodiment, as examples, methods for adjusting (in other words, changing), according to a result of LBT (e.g., a clear state of a band (or channel) or a slot format configuration in a COT), a CSI-RS resource configured prior to the LBT as described above will be described as methods for determining the CSI-RS resource.

Hereinafter, determination methods 1 to 3 for determining a CSI-RS resource according to the present embodiment will be described.

<Determination Method 1>

In determination method 1, base station 100 and terminal 200 determine whether or not to perform transmission, measurement, and reporting for a CSI-RS using a CSI-RS resource configured prior to LBT based on, for example, a result of the LBT or a slot format configuration (e.g., symbol structure).

For example, when it is determined that the CSI-RS resource configured prior to the LBT is unusable by the LBT, base station 100 and terminal 200 determine abortion (or cancellation) of the transmission, measurement, and reporting for the CSI-RS.

Further, for example, when a transmission direction (e.g., DL for CSI-RS transmission or UL for CSI reporting) corresponding to the CSI-RS resource configured prior to the LBT does not coincide with a transmission direction (e.g., DL symbol or UL symbol) configured in a symbol corresponding to the CSI-RS resource in a slot format configuration, base station 100 and terminal 200 determine abortion of the transmission, measurement, and reporting for the CSI-RS. For example, when the resource for the CSI-RS transmission is configured for the UL symbol, base station 100 aborts the CSI-RS transmission and terminal 200 aborts the CSI measurement. When the resource for the CSI reporting is configured for the DL symbol, terminal 200 aborts the CSI reporting.

On the other hand, when it is determined that a CSI-RS resource is usable by LBT and a transmission direction corresponding to the CSI-RS resource coincide with a transmission direction of a symbol corresponding to the CSI-RS resource in a slot format configuration, base station 100 and terminal 200 perform the transmission, measurement, and reporting for the CSI-RS using the resource.

Note that information on a clear state of a band by LBT and a symbol structure in a usable band are shared between base station 100 and terminal 200.

According to determination method 1, base station 100 and terminal 200 can abort unnecessary transmission, measurement, and reporting for a CSI-RS without newly adding a control signal for determining whether or not to perform transmission, measurement, and reporting for a CSI-RS.

<Determination Method 2>

In determination method 2, based on, for example, a result of LBT or a slot format configuration (e.g., symbol structure), base station 100 and terminal 200 change (in other words, shift in the time direction) a CSI-RS resource configured prior to the LBT. Then, base station 100 and terminal 200 perform transmission, measurement, and reporting for a CSI-RS using the changed CSI-RS resource.

For example, when it is determined that the CSI-RS resource configured prior to the LBT is unusable by the LBT, base station 100 and terminal 200 may change (shift in the time direction) the CSI-RS resource to a resource determined to be usable in the LBT.

Further, for example, when a transmission direction (e.g., DL for CSI-RS transmission or UL for CSI reporting) corresponding to the CSI-RS resource configured prior to the LBT does not coincide with a transmission direction (e.g., DL symbol or UL symbol) configured in a symbol corresponding to the CSI-RS resource in a slot format configuration, base station 100 and terminal 200 may change (shift in the time direction) the CSI-RS resource to a resource (e.g., DL symbol for CSI-RS transmission or UL symbol for CSI reporting) whose transmission direction coincides with the transmission direction (DL or UL).

Figure 9:
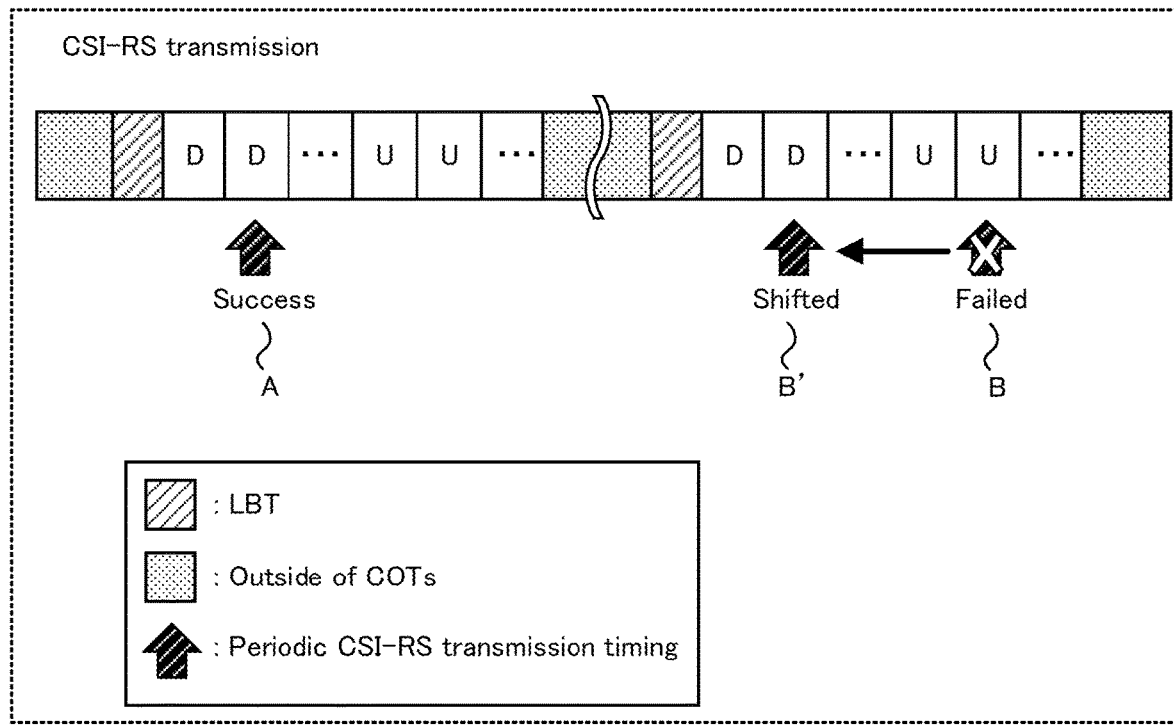
FIG. 9 is a diagram illustrating an example of CSI-RS transmission according to determination method 2.

FIG. 9 illustrates an example of CSI-RS transmission in determination method 2. In the example illustrated in FIG. 9, a timing A and a timing B of CSI-RS (Periodic CSI-RS as an example) transmission are indicated from base station 100 to terminal 200 prior to LBT.

In FIG. 9, in a slot format configuration configured based on a result of the LBT, a DL symbol (D) is configured for the timing A which is a transmission timing of a CSI-RS. Therefore, a resource corresponding to the timing A is a resource determined to be usable (in other words, within the COT) by the LBT. Further, for the resource corresponding to the timing A, a transmission direction (in other words, DL transmission) of the CSI-RS transmission coincides with a transmission direction (DL symbol) configured in the symbol in the slot format configuration. Therefore, base station 100 transmits the CSI-RS to terminal 200 at the timing A. Terminal 200 receives the CSI-RS from base station 100 at the timing A and performs CSI measurement.

On the other hand, in FIG. 9, in the slot format configuration configured based on the result of the LBT, a UL symbol (U) is configured for the timing B which is a transmission timing of the CSI-RS. Therefore, a resource corresponding to the timing B is a resource determined to be usable (in other words, within the COT) by the LBT. However, for the resource corresponding to the timing B, a transmission direction (in other words, DL transmission) of the CSI-RS transmission does not coincide with a transmission direction (UL symbol) configured in the symbol in the slot format configuration.

Therefore, as illustrated in FIG. 9, base station 100 changes (shifts) the CSI-RS transmission timing (for example, transmission resource) from the timing B to a timing B' corresponding to a DL symbol. Then, base station 100 transmits the CSI-RS to terminal 200 at the timing B'. Similar to base station 100, terminal 200 receives the CSI-RS by changing a reception timing of the CSI-RS from the timing B to the timing B', and performs CSI measurement.

Figure 10:
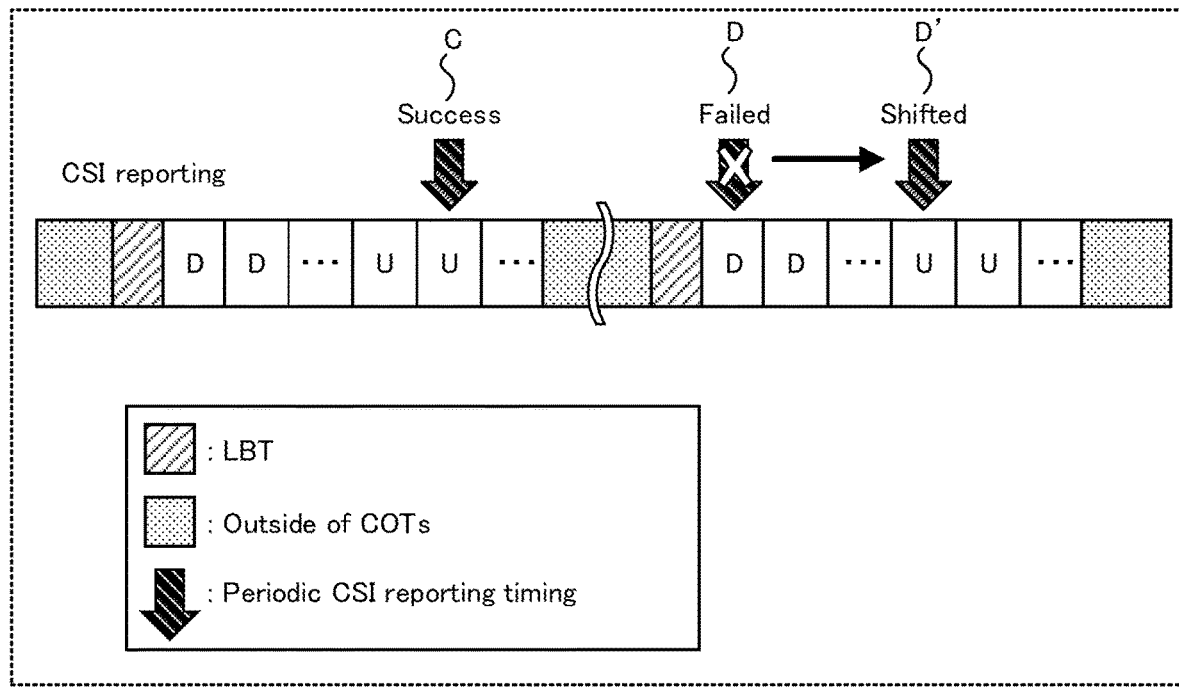
FIG. 10 is a diagram illustrating an example of CSI reporting according to determination method 2.

FIG. 10 illustrates an example of CSI reporting in determination method 2. In the example illustrated in FIG. 10, a timing C and a timing D of CSI (Periodic CSI as an example) reporting are indicated from base station 100 to terminal 200 prior to LBT.

In FIG. 10, in a slot format configuration configured based on a result of the LBT, a UL symbol (U) is configured to the timing C which is a transmission timing of a CSI-RS report. Therefore, a resource corresponding to the timing C is a resource determined to be usable (in other words, within the COT) by the LBT. Further, for the resource corresponding to the timing C, a transmission direction (in other words, UL transmission) of the CSI reporting coincides with a transmission direction (UL symbol) configured in the symbol in the slot format configuration. Therefore, terminal 200 transmits the CSI reporting signal to base station 100 at the timing C. Base station 100 receives the CSI reporting signal from terminal 200 at the timing C.

On the other hand, in FIG. 10, in the slot format configuration configured based on the result of the LBT, a DL symbol (D) is configured for the timing D which is a transmission timing of the CSI report. Therefore, a resource corresponding to the timing D is a resource determined to be usable (in other words, within the COT) by the LBT. However, for the resource corresponding to the timing D, a transmission direction (in other words, UL transmission) of the CSI reporting does not coincide with a transmission direction configured in the symbol in the slot format configuration.

Therefore, as illustrated in FIG. 10, terminal 200 shifts the transmission timing of the CSI report from the timing D to a timing D' corresponding to a UL symbol. Then, terminal 200 transmits the CSI report to base station 100 at the timing D'. Similar to terminal 200, base station 100 changes a reception timing of the CSI report from the timing D to the timing D', and receives the CSI report.

In this way, base station 100 and terminal 200 change the transmission timing of the CSI-RS and the transmission timing of the CSI report to the timings at which the CSI-RS and the CSI report can be transmitted, respectively. For example, base station 100 and terminal 200 shift the transmission timing of the CSI-RS to a DL symbol within the COT when a symbol within the COT corresponding to the transmission timing of the CSI-RS is a UL symbol. Further, base station 100 and terminal 200 shift the transmission timing of the CSI report to a UL symbol within the COT when a symbol within the COT corresponding to the transmission timing of the CSI report is a DL symbol.

As a result, according to determination method 2, it is possible to prevent opportunities of transmission, measurement, and reporting for a CSI-RS from being lost.

Note that shift amounts and shift directions in shifting transmission timings of a CSI-RS and a CSI report will be described later.

In FIGS. 9 and 10, the cases where the transmission timings configured for the CSI-RS and the CSI report corresponds to the resources within the COT have been described. However, in determination method 2, even when the transmission timings configured for the CSI-RS and the CSI report are outside the COT, base station 100 and terminal 200 may shift the transmission timings to timings of corresponding symbols within the COT, as described above.

<Determination Method 3>

In determination method 3, based on, for example, a result of LBT or a slot format configuration (e.g., symbol structure), base station 100 and terminal 200 change (in other words, shift in the time direction) a CSI-RS resource configured prior to the LBT, as in determination method 2.

In determination method 3, base station 100 indicates the changed CSI-RS resource (in other words, performing transmission, measurement, and reporting for a CSI-RS using the changed CSI-RS) to terminal 200. Terminal 200 identifies the changed CSI-RS resource based on DCI indicated from base station 100.

Then, base station 100 and terminal 200 performs the transmission, measurement, and reporting for the CSI-RS using the changed CSI-RS resource.

For example, base station 100 may indicate changed contents (e.g., at least one of a shift direction and a shift amount) of a transmission timing of a CSI-RS or a CSI report to terminal 200 by downlink control information (e.g., DCI).

In this way, when base station 100 adjusts the transmission timings of the CSI-RS and the CSI report, base station 100 indicates information indicating the adjusted transmission timings to terminal 200. This allows base station 100 to dynamically adjust the change in the transmission timing of the CSI-RS or the CSI report, for example, according to a result of LBT or a slot format configuration.

For example, base station 100 and terminal 200 may share an association (e.g., may be a table or a calculation equation) between shift amounts of the transmission timings of the CSI-RS and the CSI report and values (e.g., signaling values) indicated by the DCI. Base station 100 can indicate the determined shift amount in the association to terminal 200 with the value of the DCI.

Note that the unit of a shift amount may be, for example, the unit of slot, the unit of symbol, or a combination of the unit of slot and the unit of symbol.

The DCI for indicating the shift amount may be, for example, a group-common type of DCI (also referred to as Group Common PDCCH (GC-PDCCH)) for commonly indicating to a plurality of terminals, or may be a type of DCI (also referred to as UE specific PDCCH) for indicating to UEs individually.

As an example, FIG. 11 illustrates an example of an association (table) between signaling values and shift amounts when indicating a shift amount in the unit of slot regarding CSI-RS transmission. FIG. 12 illustrates an example of an association (table) between signaling values and shift amounts when indicating a shift amount in the unit of slot regarding CSI reporting. FIG. 13 illustrates an example of an association (table) between signaling values and shift amounts when indicating a shift amount in the unit of slot in combination with in the unit of symbol regarding CSI-RS transmission and CSI reporting.

When base station 100 shifts a transmission timing of the CSI-RS or the CSI report, base station 100 indicates DCI indicating a signaling value according to a shift amount to terminal 200, for example, according to FIG. 11, 12, or 13. Terminal 200 specifies the shift amount corresponding to the signaling value indicated by the DCI, for example, according to FIG. 11, 12, or 13.

Note that the shift amounts illustrated in FIGS. 11, 12, and 13 are examples, and are not limited thereto. For example, the shift amount is not limited to any of 0, 1, 2, and 3, but may be another value of a shift amount. Further, shift amount candidates are not limited to four types, and other candidates (in other words, signaling values of the other number of bits) may be configured.

Determination methods 1 to 3 have been described above.

As such, in the present embodiment, base station 100 and terminal 200 change, based on a time resource (for example, a COT or symbol structure in the COT) configured according to a result of LBT (in other words, carrier sense), at least one timing of a transmission timing of a CSI-RS and a reporting timing of CSI, which are configured prior to the LBT. Then, base station 100 and terminal 200 perform communication of the CSI-RS or CSI report based on the changed timing.

In this way, for example, even when allocation of a CSI-RS resource is indicated from base station 100 to terminal 200 by higher layer signaling, base station 100 and terminal 200 can secure a resource for transmission, measurement, and reporting for a CSI-RS by flexibly addressing variation in time in a COT length, a slot format, and/or the like.

Therefore, according to the present embodiment, base station 100 and terminal 200 can appropriately transmit a CSI-RS or CSI report in an unlicensed band (e.g., an unlicensed spectrum) in which an interval where base station 100 or terminal 200 cannot transmit a signal occurs.

[Shift Direction and Shift Amount]

Hereinafter, the shift direction and the shift direction with respect to the transmission timing of the CSI-RS or the CSI report described in determination methods 2 and 3 will be described.

In determination methods 2 and 3, the shift direction in the time direction of the transmission timing of the CSI-RS or the CSI report may be determined, for example, according to a symbol structure in a slot format corresponding to a CSI-RS resource configured by higher layer signaling.

For example, as illustrated in the timing B illustrated in FIG. 9, when the symbol structure corresponding to the CSI-RS resource (timing B) configured by the higher layer signaling is the UL symbol, the shift direction of the transmission timing of the CSI-RS may be determined forward (in other words, earlier direction) in time domain.

Further, for example, as illustrated in the timing D illustrated in FIG. 10, when the symbol structure corresponding to the CSI-RS resource (timing D) configured by the higher layer signaling is the DL symbol, the shift direction of the transmission timing of the CSI report may be determined backward (in other words, later direction) in time domain.

Here, for example, as illustrated in FIGS. 9 and 10, in a slot format configuration in a COT, DL symbols may be arranged earlier and UL symbols may be arranged later. In other words, in a slot format configuration in a COT, a DL burst and a UL burst may be arranged in this order. In this case, as illustrated in FIG. 9, by shifting the transmission of the CSI-RS forward to the timing B (UL symbol), it is possible to shift to the timing B' of the DL symbol arranged before the UL symbols. Similarly, as illustrated in FIG. 10, by shifting the transmission timing of the CSI report backward to the timing D (DL symbol), it is possible to shift to the timing D' of the UL symbol arranged after the DL symbol.

Alternatively, the determination of the shift direction described above may shift the transmission timing of the CSI-RS or the CSI report to a non-transmission interval (not illustrated) that may occur between a downlink signal (DL symbol) and an uplink signal (UL symbol), for example. In this case, since base station 100 and terminal 200 can perform transmission, measurement, and reporting for a CSI-RS in the non-transmission interval, it is possible to improve the resource usage efficiency in the unlicensed band.

Note that a method for determining a shift direction is not limited to the method described above. However, when the transmission timing of the CSI report is shifted to the earlier resource in the time direction, the processing of generating the CSI report at terminal 200 may not be in time for the shifted resource (in other words, the transmission timing of the CSI report). Therefore, the shift (in other words, the shift amount) of the transmission timing of the CSI report may be configured, for example, within a range in which the processing of generating the CSI report is in time for the transmission of the CSI report. Alternatively, terminal 200 may abort the CSI reporting when the processing of generating the CSI report is not in time for the shifted transmission timing, for example. In this case, between the CSI-RS transmission and the CSI reporting, the shift amounts of the transmission timings may be determined independently of each other.

In determination methods 2 and 3, when transmission, measurement, and reporting for the CSI-RS are the Periodic operation, the maximum value of the shift amount of the transmission timing of the CSI-RS or the CSI report may be limited according to a periodicity in the Periodic operation.

For example, when a periodicity is configured to 4 slots in the transmission, measurement, and reporting for the CSI-RS, the maximal value of the shift amount of the transmission timing of the CSI-RS or the CSI report may be limited to 4 slots. As a result, it is possible to suppress increases in the shift amounts of the transmission timings of the CSI-RS and the CSI report. For example, base station 100 and terminal 200 may abort (or cancel) the CSI-RS transmission or the transmission of the CSI report when the transmission timing of the CSI-RS or the CSI report must be shifted by more than the maximum value of the shift amount.

Embodiment 2

In Embodiment 1, the methods have been described in which the CSI-RS resource (e.g., the transmission timing of the CSI-RS or CSI report) is configured prior to the LBT by, for example, the higher layer signaling, and the CSI-RS resource is adjusted (in other words, changed) according to the clear state of the band or the symbol structure in the slot format configuration by the LBT.

On the other hand, in the present embodiment, methods will be described in which a CSI-RS resource (for example, a transmission timing of a CSI-RS or CSI report) is not configured prior to LBT but is configured when it is confirmed that a band is clear by the LBT.

Note that since a base station and a terminal according to the present embodiment have the same basic configuration as base station 100 and terminal 200 according to Embodiment 1, they will be described with reference to FIGS. 6 and 7.

Hereinafter, determination methods 4 to 6 for determining a CSI-RS resource according to the present embodiment will be described.

<Determination Method 4>

In determination method 4, for example, after it is confirmed that a band (or channel) is clear by LBT and a COT is configured, base station 100 (e.g., controller 102) determines a CSI-RS resource (e.g., transmission timing) based on the COT configuration (e.g., a COT structure and a slot format configuration within the COT).

Base station 100 indicates the determined CSI-RS resource to terminal 200 using downlink control information (e.g., DCI). Terminal 200 (e.g., controller 212) identifies the CSI-RS resource based on, for example, the DCI indicated from base station 100. Then, base station 100 and terminal 200 perform transmission, measurement, and reporting for a CSI-RS using the determined CSI-RS resource.

According to determination method 4, the CSI-RS resource is configured according to the COT structure or slot format configuration configured after the LBT, so that the accuracy of the transmission, measurement, and reporting for the CSI-RS can be improved.

Here, the DCI used for allocation of the CSI-RS resource may be a group common type of DCI, and the resource allocation may be simultaneously indicated from base station 100 to a plurality of terminals 200. When the group common type of DCI is used, for example, terminal 200 recognizes in advance which bit(s) of a bit string of the group common DCI is/are a signal addressed to terminal 200. Use of the group common type of DCI can reduce a signaling amount required to allocate CSI-RS resources.

Note that the DCI used for the allocation of the CSI-RS resource is not limited to the group common type of DCI, but may be a UE specific type of DCI, and the resource allocation may be individually indicated from base station 100 to each terminal 200. Use of the UE specific type of DCI can flexibly indicate allocation of a CSI-RS resource to each terminal 200.

In addition, in DCI that indicates a resource for CSI-RS measurement among CSI-RS resources, allocation frequency information (frequency domain allocation) of the CSI-RS measurement, information for determining the number of ports, a symbol number, a type of Code Division Multiplexing (CDM), density, and a frequency band may be indicated, for example. For example, for the pieces of information, a plurality of mappings (in other words, combination or referred to as CSI-RS-ResourceMapping) may be configured by higher layer signaling, and a mapping to be used may be indicated by indication of the DCI.

In addition, in DCI that indicates a resource of CSI reporting among CSI-RS resources, allocation frequency information of the CSI reporting, allocation timing information including a shift amount, information for identifying which CSI-RS transmission the CSI reporting corresponds to, and the like may be indicated, for example. For example, for the pieces of information, a plurality of patterns (in other words, combination or referred to as CSI-ReportConfig) may be configured by higher layer signaling, and a pattern of CSI reporting to be used may be indicated by indication of the DCI.

In addition, with respect to the transmission, measurement, and reporting for the CSI-RS, configurations other than the resource allocation are not limited to indication of the DCI, but may be indicated by higher layer signaling, for example. In other words, among CSI-RS resources, some configurations such as the resource allocation (e.g., transmission timing) and the other configurations may be determined separately. For example, with respect to the transmission, measurement, and reporting for the CSI-RS, the resource allocation may be configured after LBT, and the configurations other than the resource allocation may be configured before the LBT.

In addition, the CSI-RS resource allocation may be indicated in the unit of slot, in the unit of symbol, in the unit of slot in combination with in the unit of symbol. Indication in the unit of slot or in the unit of symbol may indicate, for example, the number of slots or the number of symbols from the first symbol of the first slot of the COT. For the CSI reporting, the first symbol of the slot where the UL symbol of the COT starts may be the starting point. For the CSI-RS transmission, the number of slots and the number of symbols from the first symbol of the first slot of the COT may be indicated, and for the CSI reporting, the first symbol of an uplink burst in the end slot of the COT or in a slot several slots before (for example, two slots before) the end slot may be the starting point.

<Determination Method 5>

In determination method 4, the method for indicating the CSI-RS resource from base station 100 to terminal 200 by the DCI has been described. On the other hand, in determination method 5, a method for indicating (in other words, selecting) a terminal for which transmission, measurement, and reporting for a CSI-RS are performed by DCI will be described.

In determination method 5, for example, after it is confirmed that a band (or channel) is clear by LBT and a COT is configured, base station 100 (e.g., controller 102) selects terminal 200 for which the transmission, measurement, and reporting for the CSI-RS are performed.

Then, base station 100 indicates information indicating terminal 200 for which the transmission, measurement, and reporting for the CSI-RS are performed (in other words, information indicating whether or not the transmission, measurement, and reporting for the CSI-RS are scheduled) to terminal 200 using downlink control information (e.g., DCI). Terminal 200 (e.g., controller 212) determines whether to perform reception, measurement, and reporting for the CSI-RS based on the DCI indicated from base station 100, for example. Then, base station 100 and selected terminal 200 perform the transmission, measurement, and reporting for the CSI-RS.

According to determination method 5, since terminal 200 for which the transmission, measurement, and reporting for the CSI-RS are performed is selected according to a COT structure or a slot format configuration configured after the LBT, the accuracy of the transmission, measurement, and reporting for the CSI-RS can be improved.

Here, the DCI used for indicating whether or not the transmission, measurement, and reporting for the CSI-RS are scheduled may be a group common type of DCI, and may be simultaneously indicated from base station 100 to a plurality of terminals 200. For example, terminal 200 recognizes in advance which bit(s) of a bit string of the group common DCI to reference. Based on value of the bit(s) referenced in the group common DCI, terminal 200 determines whether or not the transmission, measurement, and reporting for the CSI-RS are configured to terminal 200 (in other words, selected).

In addition, for example, a CSI-RS resource may be determined based on a slot format configuration within a corresponding COT. For example, the CSI-RS resource (e.g., transmission timing) may be configured in the end of a downlink burst in the corresponding COT.

In addition, the CSI-RS resource may be determined in the same manner in each of base station 100 and terminal 200, and may be explicitly indicated from base station 100 to terminal 200 by DCI different from the DCI used for the indication regarding the selection of terminal 200. The DCI for performing the resource allocation may be a group-common type of DCI or a UE specific type of DCI that is individually indicated to terminal 200. As a result, base station 100 and terminal 200 can flexibly determine both the indication of terminal 200 for which the transmission, measurement, and reporting for the CSI-RS are performed and the indication of the CSI-RS resource by the pieces of DCI.

In addition, configurations other than the CSI-RS resource allocation (e.g., including the selection of terminal 200 and the resource allocation) may be determined in both base station 100 and terminal 200 in association with a symbol number or slot number of the allocated resource, as described in Embodiment 1, for example.

<Determination Method 6>

Determination method 6 is a method in which determination method 4 and determination method 5 are combined.

In determination method 6, base station 100 indicates selection of terminal 200 for which transmission, measurement, and reporting for a CSI-RS are scheduled, and CSI-RS resource allocation to selected terminal 200 to terminal 200 by DCI.

For example, after it is confirmed that a band (or channel) is clear by LBT and a COT is configured, base station 100 indicates configurations regarding the transmission, to measurement, and reporting for the CSI-RS including the CSI-RS resource allocation to terminal 200 by the DCI. Note that base station 100 may simultaneously indicate the configurations regarding the transmission, measurement, and reporting for the CSI-RS including the CSI-RS resource allocation to terminal 200 to a plurality of terminal 200 by a group-common type of DCI, or may individually indicate the configurations regarding the transmission, measurement, and reporting for the CSI-RS including the CSI-RS resource allocation to terminal 200 to each terminal 200 by a UE specific type of DCI.

Determination methods 4 to 6 have been described above.

As described above, in the present embodiment, after it is confirmed that the band (or channel) is clear by the LBT and the COT is configured, base station 100 and terminal 200 determine the CSI-RS resource (e.g., transmission timing).

As a result, base station 100 and terminal 200 can flexibly determine a resource for transmission, measurement, and reporting for a CSI-RS according to variation in time in a COT length, a slot format, and/or the like. Therefore, base station 100 and terminal 200 can improve the accuracy of the transmission, measurement, and reporting for the CSI-RS.

Therefore, according to the present embodiment, base station 100 and terminal 200 can appropriately transmit a CSI-RS or CSI report in an unlicensed band (e.g., an unlicensed spectrum) in which an interval where base station 100 or terminal 200 cannot transmit a signal occurs.

Embodiment 3

In the present embodiment, a method for deferring transmission of a CSI report when the CSI report cannot be transmitted in an allocated resource will be described.

Note that since a base station and a terminal according to the present embodiment have the same basic configuration as base station 100 and terminal 200 according to Embodiment 1, they will be described with reference to FIGS. 6 and 7.

Hereinafter, determination method 7 for determining a CSI-RS resource used for transmission, measurement, and reporting for a CSI-RS according to the present embodiment will be described.

<Determination Method 7>

In determination method 7, for example, base station 100 and terminal 200 may determine resource allocation used for a CSI report based on at least one of determination methods 1 to 6 described above.

However, in determination method 7, when terminal 200 cannot transmit the CSI report within a corresponding COT with the determined resource used for the CSI report, terminal 200 does not transmit the CSI report within the COT (in other words, does not generate a CSI reporting signal), performs LBT again after the end of the COT to configure a COT, and transmit the CSI report in the COT. In other words, terminal 200 defers the CSI reporting in time.

For example, base station 100 and terminal 200 may determine whether to defer the CSI reporting based on information indicating a transmittable time in the COT.

Here, the case where the CSI report cannot be transmitted within the corresponding COT with the determined resource used for the CSI reporting may include, for example, a case where a resource allocated to the CSI reporting is outside the configured time of the COT including a resource allocated to CSI-RS transmission corresponding to the CSI reporting. In this case, for example, terminal 200 aborts transmission of the CSI report using the resource allocated to the CSI reporting (outside the configured time of the COT). Terminal 200 also retains the CSI report (or a signal prepared for generation of the CSI report) for which the transmission is aborted until the next COT is configured after the end of the configured time of the COT for which the transmission of the CSI report is aborted. When the next COT is configured, terminal 200 transmits the retained CSI report to base station 100 in the COT.

In other words, when a resource corresponding to a timing of the CSI reporting is different from the COT (e.g., outside the configured time of the COT), terminal 200 shifts the timing of the CSI reporting to another COT which is configured according to a result of different LBT.

Here, a resource for the CSI reporting in the next COT may be determined based on, for example, a slot format configuration in the COT. For example, the resource for the CSI reporting may be the first symbol of an uplink burst in the next COT.

The deferment of the CSI reporting is not limited to terminal 200, but may be determined by base station 100. In this case, base station 100 may explicitly indicate the deferment of the CSI reporting in the COT and the resource for the CSI reporting in the next COT to terminal 200 by DCI. Note that the resource allocation for the CSI reporting in the next COT may be indicated in the unit of slot, in the unit of symbol, or in the unit of slot in combination with in the unit of symbol, as in determination method 3 of Embodiment 1, for example.

Determination method 7 has been described above.

In this way, in the present embodiment, when terminal 200 cannot transmit the CSI report in the resource within the configured COT, base station 100 and terminal 200 determine to abort the transmission of the CSI report in the COT and defer the transmission of the CSI report until different COT later than the COT.

As a result, for example, even when resource allocation for CSI reporting is indicated from base station 100 to terminal 200 by higher layer signaling, base station 100 and terminal 200 can secure a resource for the CSI reporting by flexibly addressing variation in time in a COT length, a slot format, and/or the like.

Therefore, according to the present embodiment, base station 100 and terminal 200 can appropriately transmit a CSI-RS or CSI report in an unlicensed band (e.g., an unlicensed spectrum) in which an interval where base station 100 or terminal 200 cannot transmit a signal occurs.

The embodiments of the present disclosure have been described above.

Other Embodiments

In the above embodiments, the UE specific type of DCI that indicates individually for each terminal may include, in addition to the information on the transmission, measurement, and reporting for the CSI-RS, UL allocation information, DL allocation information, or no allocation information. The information on the CSI-RS transmission and the information on the CSI reporting may be included in different pieces of DCI or may be included in the same DCI.

Further, the above embodiments (or each of determination methods 1 to 7) may be classified into either the Periodic operation, the Semi-persistent operation or the Aperiodic operation in NR, and may be referred to as Periodic, Semi-persistent or Aperiodic. For example, in determination methods (e.g., determination method 2, 3 or 7) in which a transmission timing of a signal transmitted Periodically is shifted, a shift amount is determined instantaneously, so that these determination methods may be classified into either the Periodic operation or the Aperiodic operation.

Further, in the above embodiments, the case where the PDCCH is used as the downlink control channel for transmitting the control signal has been described. However, the downlink control channel for transmitting the control signal may be a control channel of another name. For example, the downlink control channel for transmitting the control signal may be an Enhanced PDCCH (EPDCCH), a Relay PDCCH (R-PDCCH), a Machine Type Communication PDCCH (MPDCCH), or the like.

Further, in the above embodiments, the higher layer signaling is assumed to be RRC signaling, but may be replaced with Medium Access Control (MAC) signaling and indication by DCI which is physical layer signaling. For the MAC signaling and the physical layer signaling, the frequency of changes can be increased compared to the RRC signaling.

Further, in the above embodiments, although the case where the DL symbol and the UL symbol are included in the slot format configuration has been described, a flexible symbol that can be used for both the DL symbol and the UL symbol may be included.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. Technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to an embodiment of the present disclosure, includes: control circuitry, which, in operation, changes, based on a time resource configured according to a result of carrier sense, at least one timing of a transmission timing of a reference signal and a reporting timing of quality information measured using the reference signal in a terminal, the transmission timing and the reporting timing being configured prior to the carrier sense; and communication circuitry, which, in operation, performs communication of the reference signal or the quality information based on the changed timing.

In the base station according to an embodiment of the present disclosure, the control circuitry, in operation, shifts the transmission timing to a downlink resource within the time resource when a resource corresponding to the transmission timing within the time resource is an uplink resource, and shifts the reporting timing to an uplink resource within the time resource when a resource corresponding to the reporting timing within the time resource is a downlink resource.

In the base station according to an embodiment of the present disclosure, the control circuitry, in operation, shifts the timing into the time resource when a resource corresponding to the timing is different from the time resource.

In the base station according to an embodiment of the present disclosure, the communication circuitry, in operation, indicates information indicating the changed timing to a terminal.

In the base station according to an embodiment of the present disclosure, the control circuitry, in operation, shifts the reporting timing to another time resource configured according to a result of different carrier sense, when a resource corresponding to the reporting timing is different from the time resource.

A terminal according to an embodiment of the present disclosure, includes: control circuitry, which, in operation, changes, based on a time resource configured according to a result of carrier sense, at least one timing of a transmission timing of a reference signal from a base station and a reporting timing of quality information measured using the reference signal, the transmission timing and the reporting timing being configured prior to the carrier sense; and communication circuitry, which, in operation, performs communication of the reference signal or the quality information based on the changed timing.

A communication method according to an embodiment of the present disclosure, includes: changing, based on a time resource configured according to a result of carrier sense, at least one timing of a transmission timing of a reference signal and a reporting timing of quality information measured using the reference signal in a terminal, the transmission timing and the reporting timing being configured prior to the carrier sense; and performing communication of the reference signal or the quality information based on the changed timing.

A communication method according to an embodiment of the present disclosure, includes: changing, based on a time resource configured according to a result of carrier sense, at least one timing of a transmission timing of a reference signal from a base station and a reporting timing of quality information measured using the reference signal, the transmission timing and the reporting tuning being configured prior to the carrier sense; and performing communication of the reference signal or the quality information based on the changed timing.

The disclosure of Japanese Patent Application No. 2019-002330, filed on Jan. 10, 2019, including the specification, drawings, and abstract is incorporated herein by reference in its entirety.

INDUSTRIAL APPLICABILITY

One embodiment of the present disclosure is useful for a communication system.

REFERENCE SIGNS LIST

100 Base station
101, 207 CSI-RS configurator
102, 212 Controller
103 DCI generator
104 CSI-RS generator
105, 209 Error correction encoder
106, 210 Modulator
107, 213 Signal allocator
108, 214 Transmitter
109, 201 Receiver
110, 202 Signal separator
111, 204 Demodulator
112, 205 Error correction decoder
113, 211 Carrier sensor
114 COT configurator
200 Terminal
203 DCI receiver
206 CSI measurer
208 CSI report generator

The invention claimed is:

1. A base station comprising:
control circuitry, which, in operation, changes, in a time resource configured according to a result of carrier sense, a transmission timing of a reference signal which is unusable for a communication of the reference signal, to a timing determined to be usable in the result of the carrier sense, the transmission timing being configured prior to the carrier sense; and
communication circuitry, which, in operation, performs the communication based on the changed timing, wherein
the control circuitry, in operation, shifts the transmission timing to a downlink resource within the time resource when a resource corresponding to the transmission timing within the time resource is an uplink resource.

2. The base station according to claim 1, wherein the control circuitry, in operation, shifts the timing into the time resource when a resource corresponding to the timing is different from the time resource.

3. The base station according to claim 1, wherein the communication circuitry, in operation, indicates information indicating the changed timing to a terminal.

4. The base station according to claim 1, wherein the control circuitry, in operation, shifts a reporting timing to another time resource configured according to a result of different carrier sense, when a resource corresponding to the reporting timing is different from the time resource.

5. A terminal comprising:

control circuitry, which, in operation, changes, in a time resource configured according to a result of carrier sense, a transmission timing of a reference signal from a base station which is unusable for a communication of the reference signal, to a timing determined to be usable in the result of the carrier sense, the transmission timing being configured prior to the carrier sense; and communication circuitry, which, in operation, performs the communication based on the changed timing, wherein the control circuitry, in operation, shifts the transmission timing to a downlink resource within the time resource when a resource corresponding to the transmission timing within the time resource is an uplink resource.

6. A communication method comprising:

changing, in a time resource configured according to a result of carrier sense, a transmission timing of a reference signal which is unusable for a communication of the reference signal, to a timing determined to be usable in the result of the carrier sense, the transmission timing being configured prior to the carrier sense; and performing the communication based on the changed timing, wherein the transmission timing is shifted to a downlink resource within the time resource when a resource corresponding to the transmission timing within the time resource is an uplink resource.

7. A communication method comprising:

changing, in a time resource configured according to a result of carrier sense, a transmission timing of a reference signal from a base station which is unusable for a communication of the reference signal, to a timing determined to be usable in the result of the carrier sense, the transmission timing being configured prior to the carrier sense; and performing the communication based on the changed timing, wherein the transmission timing is shifted to a downlink resource within the time resource when a resource corresponding to the transmission timing within the time resource is an uplink resource.

* * * * *